United States Patent [19]

Lapeyre et al.

[11] Patent Number: 5,108,342
[45] Date of Patent: Apr. 28, 1992

[54] HIGH YIELD PEELING MEANS AND METHOD FOR UNCOOKED WARM-WATER SHRIMP

[75] Inventors: George C. Lapeyre, New Orleans; Brent A. Ledet, Kenner; James E. Saul, Jr., Meraux, all of La.

[73] Assignee: The Laitram Corporation, Harahan, La.

[21] Appl. No.: 600,426

[22] Filed: Oct. 19, 1990

[51] Int. Cl.⁵ .............................................. A22C 29/00
[52] U.S. Cl. ............................................ 452/5; 452/19
[58] Field of Search ............................ 452/5, 2, 9, 19

[56] References Cited

U.S. PATENT DOCUMENTS

| | | | |
|---|---|---|---|
| Re. 26,971 | 10/1970 | Lapeyre | 452/5 |
| 2,778,055 | 1/1957 | Lapeyre et al. | 452/5 |
| 2,832,092 | 4/1958 | Lapeyre et al. | 452/5 |
| 3,276,878 | 10/1966 | Lapeyre | 99/111 |
| 3,383,734 | 5/1968 | Lapeyre | 452/5 |
| 3,704,484 | 12/1972 | Lapeyre et al. | 452/5 |
| 3,706,113 | 12/1972 | Lapeyre et al. | 452/5 |
| 3,816,877 | 6/1974 | Bullock | 452/5 |
| 4,947,519 | 8/1990 | Griffis | 452/19 |
| 5,005,258 | 4/1991 | Griffis | 452/19 |

*Primary Examiner*—Willis Little
*Attorney, Agent, or Firm*—James T. Cronvich

[57] ABSTRACT

Improved machinery and methods for peeling raw, warm-water shrimp to solve the prior problems of scarring the shrimp meat and removing an excess of the edible meat. It has been found that a critical nip angle of between about 21° and 33°, produced by an insert nip-forming roller having a smaller diameter than conventionally used in the prior art, considerably improves shrimp appearance while increasing the yield of shrimp meat. Attention is also given to the length and surface configuration of the insert rollers. With at least three axially aligned insert sections, better roller support prevents bowing and lengthens life. Selection of different axially disposed surface configurations permits special-purpose treatment of shrimp. For example, initial removal of waste is expedited by knurled surface sections, and final treatment by smoother sections prevents disfiguration of the peeled shrimp meat.

18 Claims, 2 Drawing Sheets

HIGH YIELD PEELING MEANS AND METHOD FOR UNCOOKED WARM-WATER SHRIMP

FIELD OF THE INVENTION

The invention relates generally to the problems of grasping and peeling slimy warm-water raw shrimp with automatic peeling machines to remove the shells and other peripheral waste from the clinging shrimp meat. More specifically, the invention relates to improvements over the peeling of shrimp in the nip of knurled rollers that cut and scrape off excessive edible shrimp meat and disfigure the surface of the shrimp meat.

BACKGROUND OF THE INVENTION

Raw, warm-water shrimp, particularly those species from such families as Penaeidae and Sicyoniidae, which are found in tropical and semi-tropical waters, are especially difficult to peel because their excessive sliminess makes them difficult to grasp in the peeling nips of conventional automatic shrimp-peeling machines. In such conventional machines, peeling nips are formed by a power roller and a smaller diameter insert roller frictionally driven by the power roller.

Precooking shrimp coagulates the slime, making them less slippery. Precooking prior to peeling using insert rollers having a diameter as small as 1.1 cm (7/16 inch), is practiced with cold-water varieties of shrimp, and is disclosed in U.S. Pat. No. 3,276,878, James M. Lapeyre, issued Oct. 4, 1966. Such precooking, however, is not practiced with warm-water shrimp for two reasons. First, in many instances, the desired end product is raw, peeled shrimp. Second, because of biological differences between warm- and cold-water shrimp, cooking warm-water shrimp prior to peeling makes them more difficult to peel than if left uncooked.

To improve the grasp of the peeling nip of the rollers on raw, warm-water shrimp, knurled insert rollers, such as those disclosed in U.S. Pat. No. 3,704,484, James M. Lapeyre and Robert F. Couret, issued Dec. 5, 1972, have been used. The spiral knife-edge knurling improves the grasp of the rollers on the shrimp to increase the speed of the peeling. Knurled insert rollers with a relatively wide diameter of 1.43 cm (9/16 inch) have been the industry standard for peeling raw, warm-water shrimp. Unfortunately, the knurling and the tight nip treat the shrimp meat harshly, resulting in the loss of edible meat. Furthermore, the harsh treatment tends to scar the shrimp meat, detracting from its appearance and, hence, its value.

Therefore, an object of the invention is to increase the yield and quality of uncooked shrimp meat peeled by shrimp peeling machines. Advantages, features, and other objects of the invention will be found throughout the following specification, claims, and drawing.

SUMMARY OF THE INVENTION

The present invention provides an improvement in the peeling of raw, warm-water shrimp to increase the yield and improve the appearance of the peeled shrimp meat. The novel peeling is performed by shrimp-peeling machinery having peeling channels, each formed by a bottom power roller and a pair of flanking side rollers spaced and elevated from the bottom roller. A sectional insert roller comprising a number of axially aligned sections and having a diameter smaller than the diameters of the bottom and side rollers occupies the crotch between the bottom and side rollers. The sectional insert roller further forms a peeling nip defining a nip angle with respect to the bottom roller. It is in the nip that peeling takes place.

The angle of the peeling nip has been found in accordance with this invention to be critical in determining the severity of the grasp of the rollers on the shrimp and, hence, the treatment of the shrimp meat. Rollers defining narrow nip angles, such as used in conventional peeling, treat the shrimp harshly; rollers defining wide nip angles incompletely peel the shrimp. Peeling resulting in less waste and shredding of the shrimp is achieved by sizing the rollers to define a range of critical nip angles. An advantage of the present invention is the gentle, yet effective, peeling accorded shrimp introduced into a peeling nip defining a critical nip angle.

The treatment of the shrimp is further modulated by the surface configuration of the insert rollers. Each insert roller is made up of a number of axially aligned sections. Each section has a surface configuration, such as, in order in increasing roughness, smooth, sandblasted, or knurled. By the feature of interlacing sections having different surface configurations, peeling parameters such as speed, yield, and gentleness can be controlled.

In one embodiment of the invention, the surface finish of the insert rollers is smooth or lightly sandblasted to effect gentle handling of the shrimp. In another embodiment, a knurled surface is shown. Such a surface is rougher on the shrimp than the smooth or sandblasted surface, but, in combination with a critical nip angle, avoids the prior art problems of shrimp waste and damage. In yet another embodiment, the insert roller sections nearer the entrance end of the peeling channels are sandblasted and those nearer the exit end are smooth, thereby providing a better grip on the shrimp when first introduced into the peeling channels to perform a first loosening and a gentler action thereafter to prevent shrimp meat from tearing or scarring. The feature of various surface configurations with each insert section provides the advantage of tailoring the configuration to perform the detailed treatment of the shrimp to meet particular production needs.

Testing of the improved gentle peeling machinery using smooth and sandblasted insert rollers defining a nip angle of about 25° resulted in increased yields of peeled meat by weight of about 4% over that of conventional methods. In an industry in which the cost of raw materials (shrimp) is much higher than the costs of labor and burden, significant economic benefits result. Furthermore, the visual appearance of the peeled shrimp was improved, with the retention of complete tail meat sections in over 75% of the peeled shrimp and with less removal of the shrimp's natural pigment.

BRIEF DESCRIPTION OF THE DRAWINGS

The preceding features of the invention will be more clearly understood from the following description of the accompanying drawings in which.

BEST MODE FOR CARRYING OUT THE INVENTION

Figure 1:
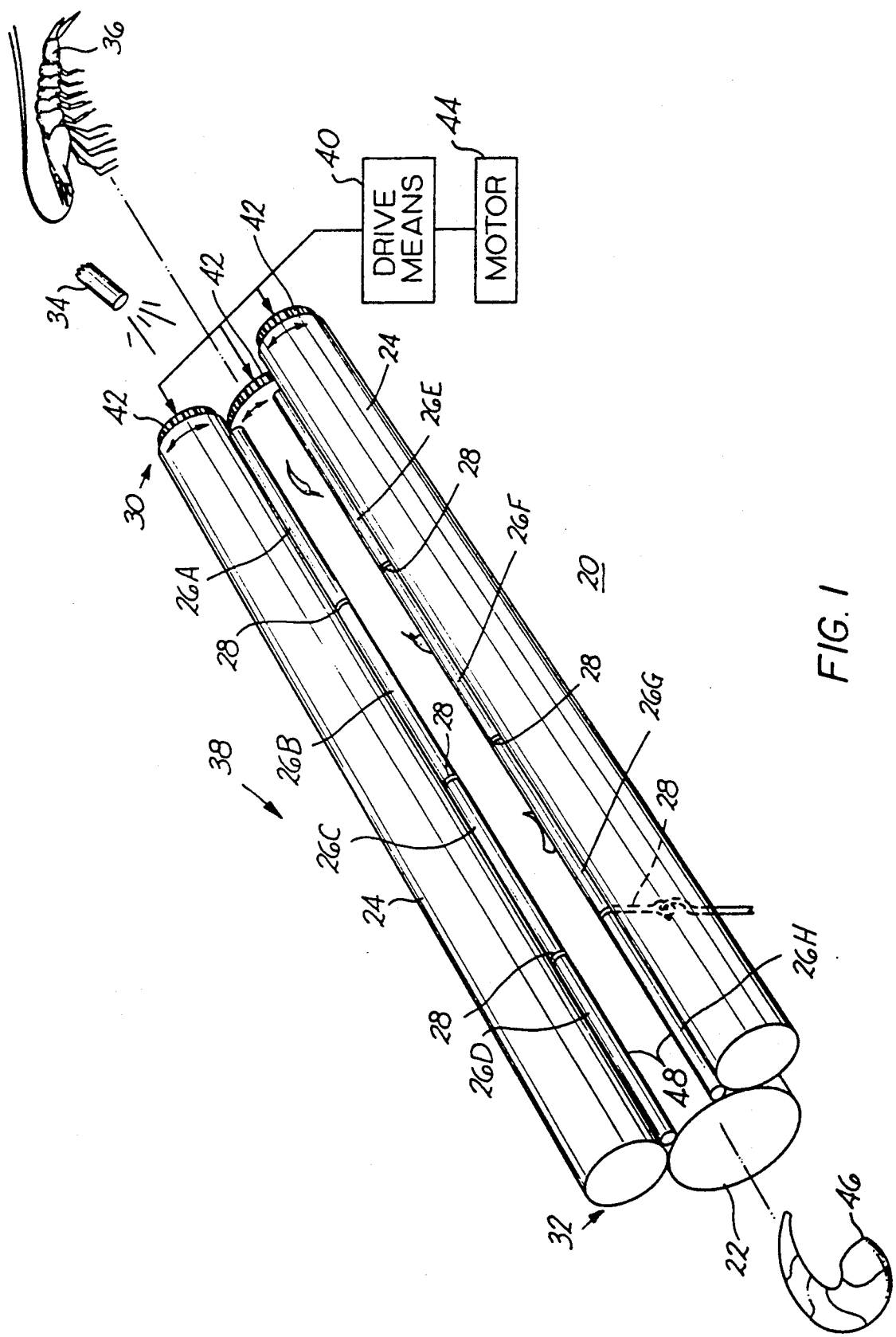
FIG. 1 is a perspective view of a peeling channel in shrimp-peeling machinery embodying the invention, including a block diagram representation of the roller drive means.

FIG. 1 shows a peeling section 20 of the shrimp-peeling machinery of the invention. Individual peeling channels are each formed by a bottom roller 22 and a pair of flanking side rollers 24 slightly elevated above the bottom rollers. Sectional insert rollers, comprising a plurality of axially aligned sections 26A–H, occupy the spaces between the bottom and side rollers. The sections comprising the insert roller are separated by holddown devices 28, which may comprise straps and collars that fit around the insert rollers without restricting their rotation. The purpose of the holddown devices is to maintain the insert rollers in contact with the bottom and side rollers by means of spring pressure. Holddown means are fully described in U.S. Pat. No. 3,706,113, James M. Lapeyre and Robert Couret, issued Dec. 19, 1972, which is incorporated herein by reference thereto. All of the rollers preferably incline downward from the shrimp entrance end 30 to the exit end 32 of the peeling channels. Such an inclination aids in the advancement of shrimp along the peeling channels, but is not essential inasmuch as the shrimp could also be advanced by other means such as a stream of water 34 or other liquid.

Unpeeled, uncooked, warm-water shrimp 36 advance in the direction of the arrow 38 along the peeling channels from the entrance end to the exit end as the rollers rotate back and forth. Rotation of the rollers is effected by a reciprocating drive means 40 engaged with the bottom and side rollers through means such as gears or sprockets 42. The drive means is activated by a motor 44. The details of a driving mechanism are disclosed in U.S. Pat. No. 3,626,551, James M. Lapeyre, issued Dec. 14, 1971, which is hereby incorporated by reference thereto. The driven bottom and side rollers are rubber-coated to frictionally drive the idling metal insert rollers.

Besides helping advance the shrimp along the channels, the back-and-forth rotation of the rollers shifts the shrimp alternately from one side of the channels to the other. Consequently, the shrimp are presented in constantly changing positions to the nips 48 between the bottom roller and the insert rollers for fresh grips by such rollers to provide every opportunity for peeling. Peeled shrimp meat 46 exits the channel at the exit end 32.

Figure 2:
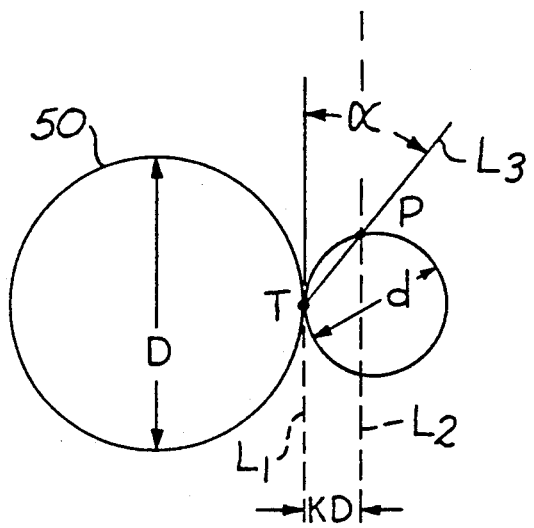
FIG. 2 is a geometrical representation showing the definition of the nip angle $a$ between the bottom roller and the insert roller.

The severity of the grasp of the roller nips depends on, among other things, the nip angle formed by the bottom roller and the insert roller. The nip angle as defined herein is shown in FIG. 2, which shows the geometrical arrangement of a bottom roller 50 having a diameter D in tangential contact at point T with an insert roller 52 with a diameter of d. Line $L_1$ is the tangent line common to both rollers through tangent point T. Line $L_2$ is a line parallel to line $L_1$ and separated from $L_1$ by a distance kD, where kD represents a fraction of the diameter D of the bottom roller 50. For the purpose of fixing the definition of the nip angle, the fractional constant k is chosen to be 0.025. In other words, line $L_1$ is separated from line $L_2$ by 0.025 D, or 2.5% of the diameter D of the bottom roller. The line $L_2$ intersects the surface of the insert roller 52 at a point P. Points T and P determine a line $L_3$. The nip angle $\alpha$ is defined as the angle between line $L_1$ and line $L_3$. It can be shown through basic trigonometry that the nip angle $\alpha$ is given by $\alpha = \text{arccotangent}[(d/kD - 1)^{\frac{1}{2}}]$. Nip angles are listed in Table 1 for various diameter ratios D/d with k=0.025.

TABLE 1

| Nip Angle $\alpha$ | Ratio of the roller diameters D/d |
| --- | --- |
| 33.2° | 12.0 |
| 29.3° | 9.6 |
| 26.6° | 8.0 |
| 24.5° | 6.9 |
| 22.8° | 6.0 |
| 21.4° | 5.3 |
| 20.3° | 4.8 |

Figure 3:
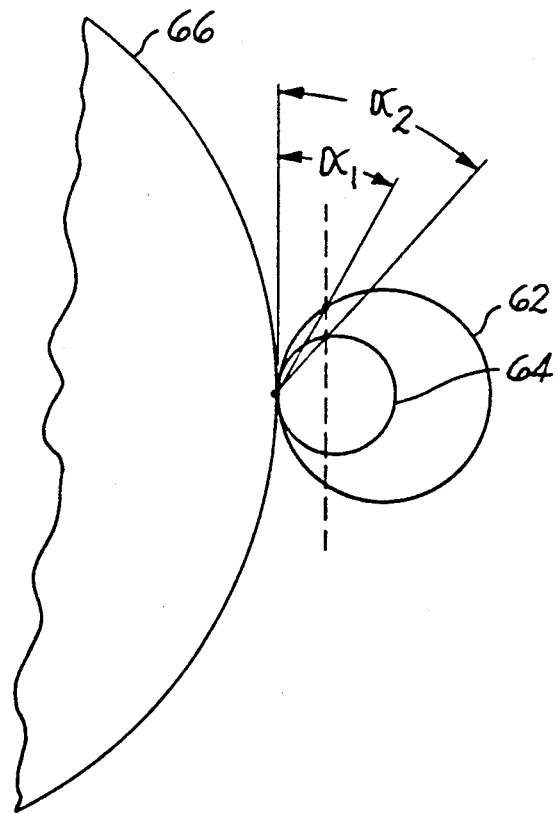
FIG. 3 is a geometrical representation of a range ($\alpha_1$ through $\alpha_2$) of critical angles that achieve the peeling advantages of the invention.

FIG. 3 shows the dependence of nip angle on the diameter of the insert roller for a bottom roller 66 of a given diameter. The narrower the insert roller, the wider is the nip angle and the gentler is the peeling. The tighter nip angle $\alpha_1$, formed by insert roller 62 and the bottom roller 66, pinches the shrimp more harshly than the wider angle $\alpha_2$, formed by the narrower diameter of insert roller 64. As is obvious from FIG. 3, moreover, the narrower insert roller presents less peeling surface to the shrimp. The wider nip angle, along with the smaller peeling surface of the narrower insert roller, effects a gentler peeling action, resulting in less damage to edible shrimp meat.

Of course, if the nip angle is too wide, the peeling action becomes too gentle and peripheral waste is not effectively removed from the shrimp. A range of nip angles, as defined herein, from about 21° to about 33° effectively peel shrimp. A nip angle of about 25° is most preferred.

The conventional aggressive peeling of raw, warm-water shrimp that has been practiced for years is exemplified by the Laitram Model A Peeler, manufactured by Laitram Machinery, Inc., Harahan, LA, a subsidiary of the assignee of this application. The conventional insert roller for a Laitram Model A peeling machine, which has a peeling section about 60 inches (152.4 cm) long, comprises two knurled sections, each 9/16 inch (1.4 cm) in diameter and about 30 inches (76.2 cm) in length. Such a roller aggressively peels shrimp at a high production rate, but causes noticeable damage to the peeled shrimp meat, affecting both yield and appearance.

In a preferred embodiment of the improvement of the invention shown in FIG. 1 for use with the Laitram Model A peeling machine, the two insert rollers comprise four insert sections 26A–D and 26E–H, each 7/16 inch (1.1 cm) in diameter and about 15 inches (38.1 cm) long. In conjunction with a bottom roller having a diameter of 3 inches (7.6 cm), a critical nip angle of about 25° is formed. Because the insert rollers are held down between sections, the embodiment of FIG. 1 requires more holddown devices than the conventional two-section insert roller. The additional holddowns spaced about every 15 inches (38.1 cm) also prevent the narrower diameter insert sections from bowing and bending with use, thereby improving their contact with the bottom and side rollers for consistent peeling and extending their useful life.

A variation of the embodiment just described includes insert rollers having three insert sections instead of four. Each section is about 20 inches (50.8 cm) long. Although more susceptible to bending and bowing than the shorter four-step insert sections, the longer three-step insert sections require fewer holddown devices along the length of the insert roller.

The gentleness of the peeling action afforded by the wider critical nip angle of the invention can be further modulated by the surface configuration of the insert sections. In an embodiment achieving the gentlest peeling action, insert sections 26A-D and 26E-H having a smooth surface finish are used. In another embodiment, for a better grasp on the shrimp with perhaps slightly more damage to the meat, but not so great as with the conventional knurled insert rollers, a sandblasted finish on the insert roller sections 26A-H is used. In a further embodiment, a knurled finish on the insert roller sections 26A-H is used for an even tighter grasp on the shrimp. The harsh treatment generally caused by knurling is mitigated by the wider nip angle of the invention.

The ability to tailor the peeling to special production needs is illustrated by another embodiment found to be particularly effective. Both sandblasted and smooth surface configurations are used, the insert sections 26A-B and 26E-F nearer the entrance end of the peeler being sandblasted and the sections 26C-D and 26G-H nearer the exit end being smooth. In that way, the initial loosening can be performed by the better gripping, sandblasted inserts, and the final separation of meat from shell, head, and appendages can be handled by the smooth inserts. A knurled surface on insert sections 26A-B and 26E-F, instead of sandblasted, represents another embodiment providing harsher gripping near the entrance end. Yet another embodiment may include a sequence of surface configurations from the entrance end to the exit end of the peeling channels progressing from rough to smooth.

Although embodiments showing improved insert roller configurations for peeling uncooked, warm-water shrimp have been described, it would be apparent to those skilled in the art that variations of the embodiments shown can be accomplished. It is evident that this invention has advanced the state of the art by providing equipment and treatment methods for peeling raw, warm-water shrimp without the waste and disfiguration of meat incurred with the tight-nipped, knurled insert rollers of the prior art.

What is claimed is:

1. Shrimp peeling machinery specially adapted to peel raw, warm-water shrimp, comprising in combination:
   a shrimp peeling channel formed by two larger diameter rollers frictionally counterrotating a smaller diameter insert roller disposed to grasp shrimp in a peeling nip between one of the larger diameter rollers and the smaller diameter insert roller; and
   means limiting a nip angle for grasping shrimp to between about 21° and 33°.

2. The combination of claim 1 wherein said insert roller comprises a series of at least three axially aligned insert roller sections having predetermined surface configurations.

3. The shrimp peeling machinery of claim 2 wherein said nip angle is about 25°.

4. The shrimp peeling machinery of claim 2 wherein the surface configuration of said insert sections is smooth.

5. The shrimp peeling machinery of claim 2 wherein the surface configuration of said insert sections is sandblasted.

6. The shrimp peeling machinery of claim 2 wherein the surface configuration of said insert sections is knurled.

7. The shrimp peeling machinery of claim 2 wherein said insert sections have at least two different surface configurations.

8. The shrimp peeling machinery of claim 7 wherein the surface configuration of said insert sections nearer the entrance end of said peeling channel is rougher than the surface configuration of said insert sections nearer the exit end.

9. The shrimp peeling machinery of claim 8 wherein the surface configuration of said insert sections nearer the entrance end of said peeling channel is sandblasted and the surface configuration of said insert sections nearer the exit end is smooth.

10. The shrimp peeling machinery of claim 8 wherein the surface configuration of said insert sections nearer the entrance end of said peeling channel is knurled and the surface configuration of said insert sections nearer the exit end is smooth.

11. The shrimp peeling machinery of claim 2 wherein each of said insert rollers comprises four axially aligned insert sections.

12. The shrimp peeling machinery of claim 2 wherein the diameter of said insert rollers is about 1.1 cm.

13. The shrimp peeling machinery of claim 2 wherein each of the insert sections of said insert rollers is shorter than about 50 cm.

14. The shrimp peeling machinery of claim 13 wherein each of the insert sections of said insert rollers is about 38 cm in length.

15. Shrimp peeling machinery specially adapted to peel raw, warm-water shrimp, comprising in combination,
   means for feeding shrimp along a processing path for peeling by grasping the shrimp into a nip between two rollers; means for introducing the shrimp into the nip at various lengths along said processing path; and
   means for confining a nip angle for grasping the shrimp to between about 21° and 33°.

16. Shrimp peeling machinery for peeling raw, warm-water shrimp to increase the yield and improve the appearance of edible shrimp meat, comprising:
   a bottom roller;
   side rollers disposed on opposite sides of said bottom roller and spaced and elevated therefrom to form a peeling channel, said peeling channel having an entrance end and an exit end; a motor;
   reciprocating drive means engaged with said bottom and side rollers and drivably connected to said motor such that rotation of said motor causes said bottom and side rollers to rotate alternately clockwise and counterclockwise;
   means for advancing shrimp along said peeling channel from the entrance end to the exit end;
   insert rollers associated with said bottom and side rollers and occupying the crotch between said bottom and side rollers, each of said insert rollers comprising at least three axially aligned insert sections, each section having a surface configuration., and
   holddown means resiliently connected to said machinery and operatively associated with the sections of said insert rollers so that each section of said insert rollers is maintained in frictional contact with said bottom and side rollers whereby the rotation of said bottom and side rollers causes the sections of said insert rollers to rotate counter to the rotation of said bottom and side rollers in contact therewith;

said insert rollers further forming peeling nips with said bottom roller, said peeling nips defining a nip angle of between about 21° and 33°, whereby raw, slimy, unpeeled, warm-water shrimp introduced into said peeling channel at the entrance end, while being urged along said peeling channel by said means for advancing, are shifted from one side of said channel to the other by the alternating direction of rotation of said bottom roller and presented in constantly changing positions to said peeling nips for fresh grips by said insert and bottom rollers, said peeling nips alternately squeezing and releasing shrimp to separate shell and appendages from edible shrimp meat, thereby producing peeled shrimp of high quality and yield at the exit end of said channel.

17. A method of increasing yield and improving product appearance in the processing of raw, warm-water shrimp by peeling machinery of the motor-driven counter-rotating roller type, comprising in combination the steps of:

forming a peeling channel with a bottom roller, a pair of flanking side rollers, and sectional insert rollers rotatably held in the crotches between the bottom and side rollers;

introducing unpeeled shrimp into the peeling channel;

advancing the shrimp along the channel;

rotating the bottom and side rollers back and forth to shift the shrimp from one side of the channel to the other into and out of peeling nips defining a nip angle of between about 21° and 33°, said nips formed by the sectional insert rollers having peeling surfaces; and progressively changing the peeling surfaces of the sections of the insert rollers along the peeling channel to subject the shrimp to different peeling treatments.

18. The method of claim 17 wherein the surface configurations of a set of at least three axially aligned sections of the insert rollers vary from rough to smooth in the direction of advancement along the channel.

* * * * *